United States Patent
Kennedy et al.

(10) Patent No.: US 11,334,130 B1
(45) Date of Patent: May 17, 2022

(54) METHOD FOR POWER BRAKE STAGGERING AND IN-RUSH SMOOTHING FOR MULTIPLE ENDPOINTS

(71) Applicant: Dell Products L.P., Round Rock, TX (US)

(72) Inventors: Jeffrey L. Kennedy, Austin, TX (US); Timothy M. Lambert, Austin, TX (US); Yuchen Xu, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/952,467

(22) Filed: Nov. 19, 2020

(51) Int. Cl.
| | |
|---|---|
| *G06F 1/26* | (2006.01) |
| *G06F 13/42* | (2006.01) |
| *G06F 1/28* | (2006.01) |
| *G06F 1/30* | (2006.01) |
| *G06F 1/3206* | (2019.01) |
| *G06F 1/18* | (2006.01) |
| *G06F 9/02* | (2006.01) |
| *G06F 9/4401* | (2018.01) |

(52) U.S. Cl.
CPC .............. *G06F 1/26* (2013.01); *G06F 1/185* (2013.01); *G06F 1/189* (2013.01); *G06F 1/28* (2013.01); *G06F 1/30* (2013.01); *G06F 1/305* (2013.01); *G06F 1/3206* (2013.01); *G06F 9/02* (2013.01); *G06F 9/4401* (2013.01); *G06F 13/4221* (2013.01); *G06F 2213/0026* (2013.01)

(58) Field of Classification Search
CPC . G06F 1/26; G06F 1/185; G06F 1/189; G06F 1/28; G06F 1/30; G06F 1/305; G06F 1/3206; G06F 9/02; G06F 9/4401; G06F 13/4221; G06F 2213/0026
See application file for complete search history.

(56) References Cited

U.S. PATENT DOCUMENTS

| | | | | |
|---|---|---|---|---|
| 2011/0316509 | A1* | 12/2011 | Chen | H03K 17/166 323/282 |
| 2012/0137159 | A1* | 5/2012 | Chin | G06F 1/26 713/340 |
| 2014/0164813 | A1* | 6/2014 | Alshinnawi | G06F 1/3287 713/330 |
| 2015/0370296 | A1* | 12/2015 | Purcell | G06F 11/221 714/43 |
| 2016/0048184 | A1* | 2/2016 | Basile | G06F 8/65 713/310 |
| 2017/0262953 | A1* | 9/2017 | Ragupathi | G06F 9/5083 |
| 2018/0095510 | A1* | 4/2018 | Tsao | G06F 1/325 |
| 2020/0110683 | A1* | 4/2020 | Wang | G06F 11/273 |
| 2020/0293661 | A1* | 9/2020 | Liu | G06F 21/575 |

(Continued)

*Primary Examiner* — Glenn A. Auve
(74) *Attorney, Agent, or Firm* — Baker Botts L.L.P.

(57) ABSTRACT

Systems and methods for staggering the release of multiple endpoints from a power brake event. A MCU on each riser implements a riser offset delay based on its position in an order in which power is to be released. For a riser with multiple slots, a delay circuit may be connected to one or more slots to provide a unique offset time to delay the release of power supply the slot. In some systems, a baseboard management controller (BMC) identifies endpoints subject to a power brake event during a POST process. Risers and slots that are not subject to a power brake event are identified and not included in the determination of delays or offset times.

20 Claims, 5 Drawing Sheets

(56) References Cited

U.S. PATENT DOCUMENTS

| | | | |
|---|---|---|---|
| 2020/0341929 A1* | 10/2020 | Lambert | G06F 13/385 |
| 2021/0048863 A1* | 2/2021 | Rahardjo | G06F 1/189 |
| 2021/0081214 A1* | 3/2021 | Lambert | G06F 9/4411 |
| 2021/0191492 A1* | 6/2021 | Wang | G06F 1/3206 |

* cited by examiner

METHOD FOR POWER BRAKE STAGGERING AND IN-RUSH SMOOTHING FOR MULTIPLE ENDPOINTS

BACKGROUND

Field of the Disclosure

This disclosure relates generally to information handling systems and, more particularly, to methods for staggering the release of multiple endpoints from a power brake event.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In information handling systems with complex endpoint options, commands to multiple risers are consolidated to support cost, cooling, density and robustness tenets.

For example, to throttle multiple peripheral component interconnect express (PCIe) endpoints, a complex programmable logic device (CPLD) connected to the PCIe endpoints may hold a one-wire signal low to indicate that power to the endpoint should be throttled, such as to assert a power brake event. When the power brake event is over, the one-wire signal is held high to indicate power should be released to the multiple endpoints to de-assert the power brake event. All PCIe endpoints may receive the signals at substantially the same time, causing multiple PCIe endpoints to power up simultaneously.

Power specifications for components in information handling systems continue to increase. For example, card electromechanical specification (CEM) 5.0 defines standards for compatibility of peripheral devices and specifies up to 600 W per PCIe slot. These power requirements impose power transient situations requiring robust system designs.

SUMMARY

Trends of increased number of PCIe and Compute Express Link (CXL) lanes, as well as artificial intelligence/machine learning trends require multi-slot devices utilizing high power endpoints.

When a power brake event occurs in an information handling system, power to endpoints such as risers may be drastically reduced (commonly referred to as throttled). Since a riser may have multiple slots, a power brake event may affect multiple slots. When the information handling system is released from the power brake event, supplying power to all slots on all risers at the same time causes a current spike. Embodiments disclosed herein may be generally directed to information handling systems and methods for staggering releases of multiple risers and multiple endpoints from power brake events. Some embodiments may be directed to a system for controlling power to multiple endpoints, wherein the system comprises a baseboard management controller (BMC), a complex programmable logic device (CPLD) and a microcontroller unit (MCU) on each riser of a set of risers. The BMC may identify a set of risers subject to a power brake event, determine an order for de-asserting a power brake event for the set of risers and communicate order to a complex programmable logic device (CPLD). The order may be based on a source connector instance identifier or cable connection number, coupling or intended fixed riser location. The CPLD is configured to communicate a first signal to assert a power brake event and communicate a second signal to de-assert the power brake event. Each MCU on a riser comprises a processor and a set of MCU instructions executable by the MCU processor to communicate with the BMC to determine a source connector instance identifier for the riser; determine a riser offset time for the riser based on the source connector instance identifier for the riser; in response to receiving the first signal from the CPLD to assert the power brake event, throttle power to a set of slots on the riser; and in response to receiving the second signal from the CPLD to de-assert the power brake event, release power to the set of slots on the riser based on the riser offset time.

Some embodiments may be directed to an information handling system comprising a baseboard management controller (BMC) comprising a set of BMC instructions to identify a set of risers subject to a power brake event; determine a source connector instance identifier for each riser of the set of risers; and communicate the source connector instance identifier for each riser of the set of risers to a complex programmable logic device (CPLD) having a set of CPLD instructions to communicate a first signal to the set of risers to assert a power brake event and communicate a second signal to the set of risers to de-assert the power brake event. A riser of the set of risers may comprise a microcontroller unit (MCU) configured to communicate with the BMC to determine a source connector instance identifier for the riser; determine a riser offset time for the riser based on the source connector instance identifier for the riser; in response to receiving the first signal from the CPLD to assert the power brake event, throttle power to a set of slots on the riser; and in response to receiving the second signal from the CPLD to de-assert the power brake event, release power to the set of slots on the riser based on the riser offset time.

A riser may comprise a first slot configured to receive power with no delay when power is released to the riser; and a second slot with a delay circuit configured to delay power to the second slot when power is released to the riser. The delay circuit may comprise a resistor-capacitor (RC) delay circuit configured to delay power supply to the second slot; and a Schmitt trigger buffer located between the RC delay circuit and the second slot. In some embodiments, one or more of the resistor and the capacitor is configured to minimize a discharge of the capacitor when a power brake event is asserted. The riser may comprise a fixed riser or a floating riser. In some embodiments, the CPLD is configured to communicate with the set of MCU processors over a one-wire signal. In some embodiments, the MCU instructions are executable by the MCU processor to monitor one-wire signals communicated by the CPLD; assert a power brake event on the riser when the one-wire signal comprises a low voltage; and de-assert the power brake event on the riser when the one-wire signal comprises a high voltage.

Some embodiments may be directed to a method for releasing multiple endpoints from a power brake event. The method may comprise a baseboard management controller (BMC) determining a set of risers receiving power in an information handling system; determining a source connector instance identifier for each riser of the set of risers; determining a set of slots on each riser; calculating an offset time for each slot based on the source connector instance of the riser and the number of slots on the riser; and communicating, to a microcontroller unit (MCU) on a riser, the offset time for each slot based on the source connector instance identifier and the number of slots on the riser. The method may also include the MCU throttling power to the set of slots in response to receiving a first signal from a complex programmable logic device (CPLD) to assert the power brake event and the MCU releasing power to each slot of the set of slots based on the offset time for the slot in response to receiving a second signal from the CPLD to de-assert the power brake event. The method may include determining a quantity of slots on the first riser subject to the power brake event; calculating a riser offset time for the first riser based on the number of slots on the first riser and a time period allotted to release power individually to each slot; and communicating the riser offset time for the first riser to the BMC. The BMC may be configured to perform: receiving the riser offset time for the first riser and communicating the riser offset time to a second MCU on a second riser. The second MCU is configured to perform: receiving the riser offset time from the CPLD; and calculating an offset time for each slot on the second riser based on the source connector instance of the second riser and the number of slots on the second riser. Embodiments of the method may include the CPLD communicating the first signal as a low voltage signal over a one-wire channel and communicating the second signal as a high voltage signal over the one-wire channel. Determining the set of risers receiving power in the information handling system and determining the set of slots on each riser may be performed during one of a power on self-test (POST) process or a boot process.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

Figure 1:
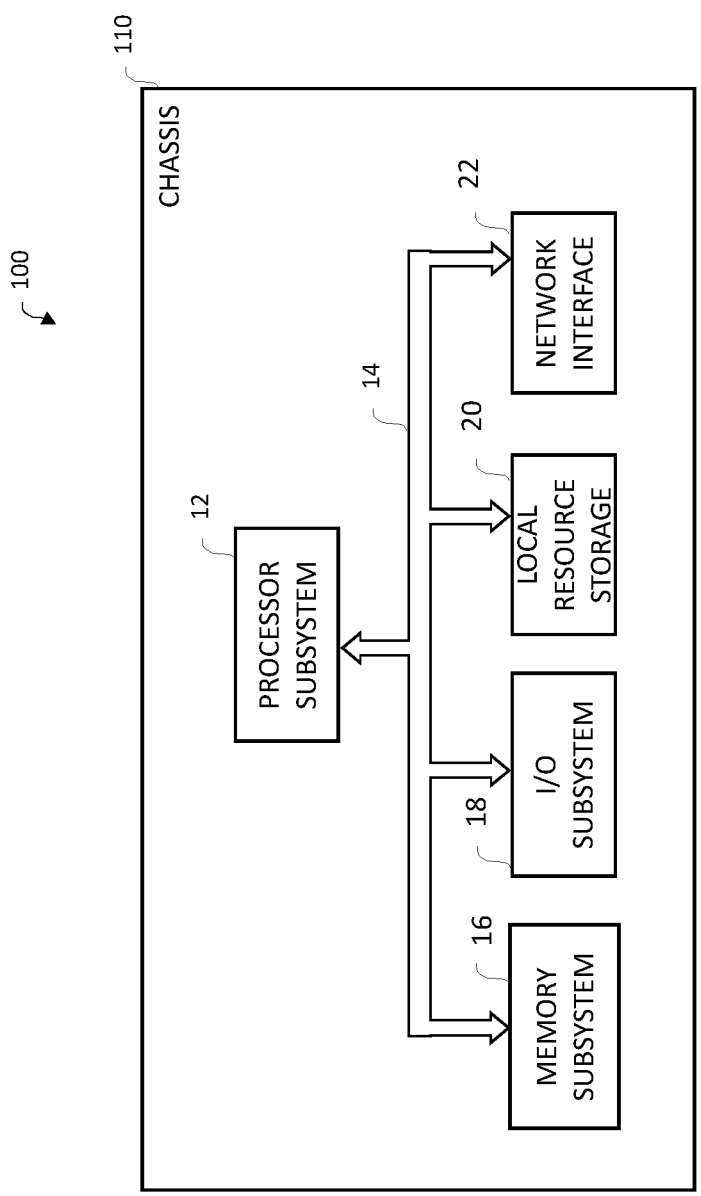
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the unhyphenated form of the reference numeral refers to the collective or generic element. Thus, for example, slot "210-1" refers to a slot, which may be referred to collectively as slots "210" and any one of which may be referred to generically as slot "210."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

Embodiments disclosed herein are described with respect to information handling systems with one or more risers, each riser may have a card installed therein, with the card comprising a plurality of slots. Thus, power supplied to the riser may be supplied to all the slots on a card, and throttling power to the riser may throttle power to multiple slots on the card.

Particular embodiments are best understood by reference to FIGS. 1-6, wherein like numbers are used to indicate like and corresponding parts.

Turning to the drawings, FIG. 1 illustrates a block diagram depicting selected elements of an embodiment of information handling system 100 in chassis 110. It is noted that FIG. 1 is not drawn to scale but is a schematic illustration.

As shown in FIG. 1, components of information handling system 100 may include, but are not limited to, a processor subsystem 12, which may comprise one or more processors, and a system bus 14 that communicatively couples various system components to processor subsystem 12 including, for example, a memory subsystem 16, an I/O subsystem 18, local storage resource 20, and network interface 22.

Processor subsystem 12 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 12 may interpret and execute program instructions and process data stored locally (e.g., in memory subsystem 16). In the same or alternative embodiments, processor subsystem 12 may interpret and execute program instructions and process data stored remotely (e.g., in a network storage resource).

System bus 14 may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Memory subsystem 16 may comprise a system, device, or apparatus operable to retain and retrieve program instructions and data for a period of time (e.g., computer-readable media). Memory subsystem 16 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 18 may comprise a system, device, or apparatus generally operable to receive and transmit data to or from or within information handling system 100. I/O subsystem 18 may represent, for example, a variety of communication interfaces, graphics interfaces, video interfaces, user input interfaces, and peripheral interfaces. In various embodiments, I/O subsystem 18 may be used to support various peripheral devices, such as a touch panel, a display adapter, a keyboard, a touch pad, or a camera 24, among other examples. In some implementations, I/O subsystem 18 may support so-called 'plug and play' connectivity to external devices, in which the external devices may be added or removed while information handling system 100 is operating.

Local storage resource 20 may comprise computer-readable media (e.g., hard disk drive, floppy disk drive, CD-ROM, and other type of rotating storage media, flash memory, EEPROM, or another type of solid-state storage media) and may be generally operable to store instructions and data.

Network interface 22 may be a suitable system, apparatus, or device operable to serve as an interface between information handling system 100 and a network (not shown). Network interface 22 may enable information handling system 100 to communicate over a network using a suitable transmission protocol or standard. In some embodiments, network interface 22 may be communicatively coupled via a network to a network storage resource (not shown). A network coupled to network interface 22 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to network interface 22 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to network interface 22 or various components associated therewith may be implemented using hardware, software, or any combination thereof.

Figure 2:
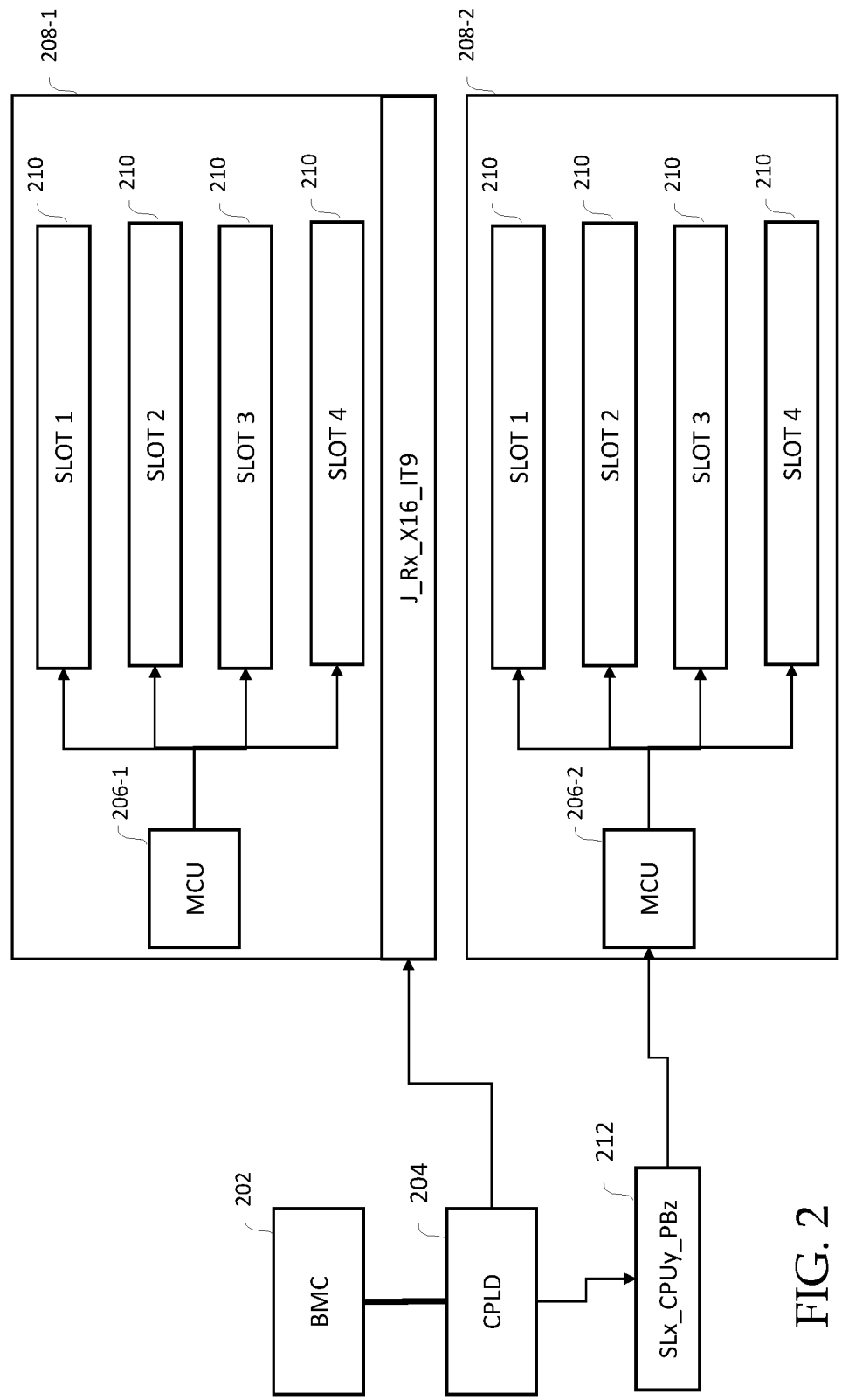
FIG. 2 is a block diagram of components affected by a power brake event.

Referring to FIGS. 1 and 2, information handling system 100 may include baseboard management controller (BMC) 202 in communication with complex programmable logic device (CPLD) 204, with CPLD 204 communicatively coupled to multiple MCUs 206 on risers 208.

BMC 202 may comprise a processor (not shown) for executing a set of instructions. In some embodiments, during a power on self-test (POST) or boot process, BMC 202 may determine an inventory in information handling system 100. The inventory may include information about risers 208. For example, BMC 202 may identify first riser 208-1 and second riser 208-2.

CPLD 204 may determine when to throttle power to risers 208 in information handling system 100 based on user policy and information received from BMC 202 indicating one or more risers 208 subject to a power brake event. In some embodiments, if a riser 208 or any slot 210 on the riser 208 supports a power brake event, CPLD 204 sends a communication to that riser 208 to assert the power brake event.

MCUs 206 may comprise an MCU processor (not shown) for executing a set of instruction. Each MCU 206 may communicate with BMC 202 to determine the order in which power is to be released to each riser 208. MCUs 206 may be communicatively coupled to CPLD 204 to receive signals to assert and de-assert power brake events. When an MCU 206 receives a communication to assert a power brake event, MCU 206 throttles power to a riser 208 and all slots 210 on the riser 208.

As depicted in FIG. 2, MCU 206-1 may be associated with first riser 208-1 having four slots 210 and MCU 206-2 may be associated with second riser 208-2 also having four slots 210. First riser 208-1 may be a fixed riser 208 directly coupled to a motherboard with an identifier (e.g., "J_Rx_X16_IT9"). Second riser 208-2 may be a floating riser coupled to a motherboard via a cable 212 and identified as a slot 210 (e.g., "SLx-CPUy_PBz"), for example.

Assertion of a Power Brake Event

Figure 6:
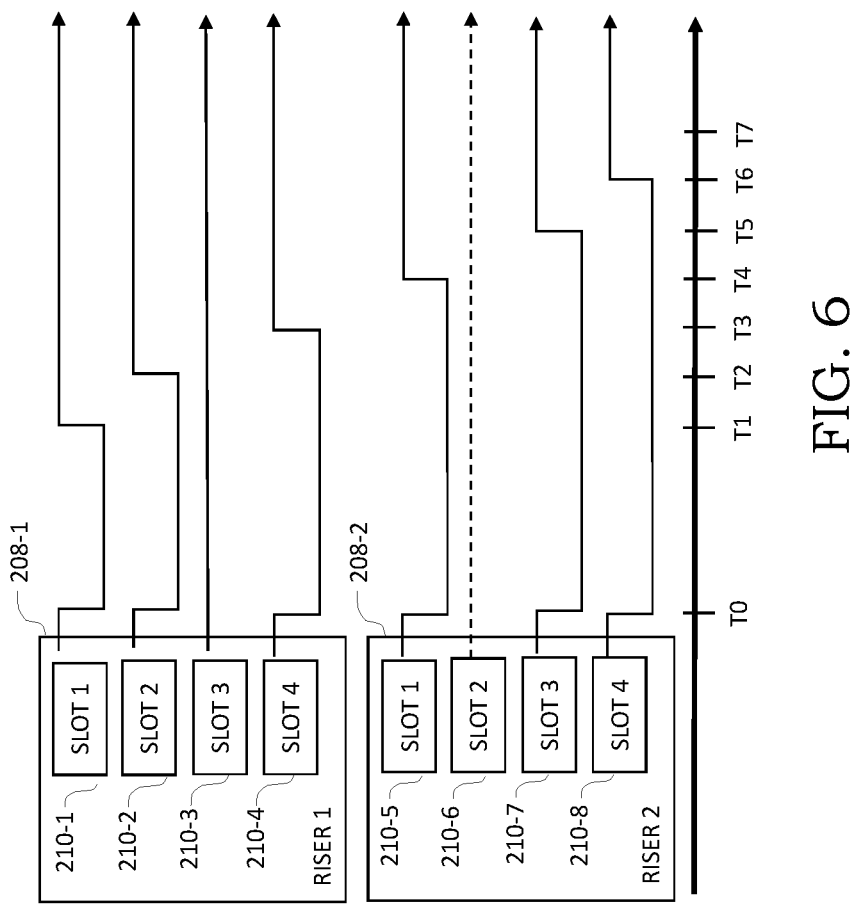
FIG. 6 is a timeline depicting the assertion of a power brake event and a de-assertion of the power brake event with staggered release of power to multiple risers and multiple slots.
Figure 3:
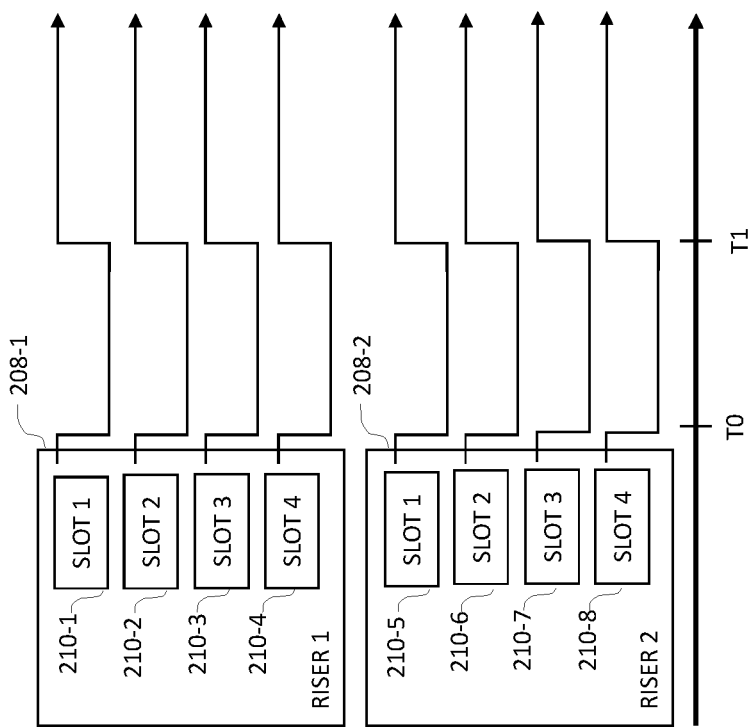
FIG. 3 is a timeline depicting the assertion of a power brake event and a de-assertion of the power brake event to all components simultaneously.
Figure 5:
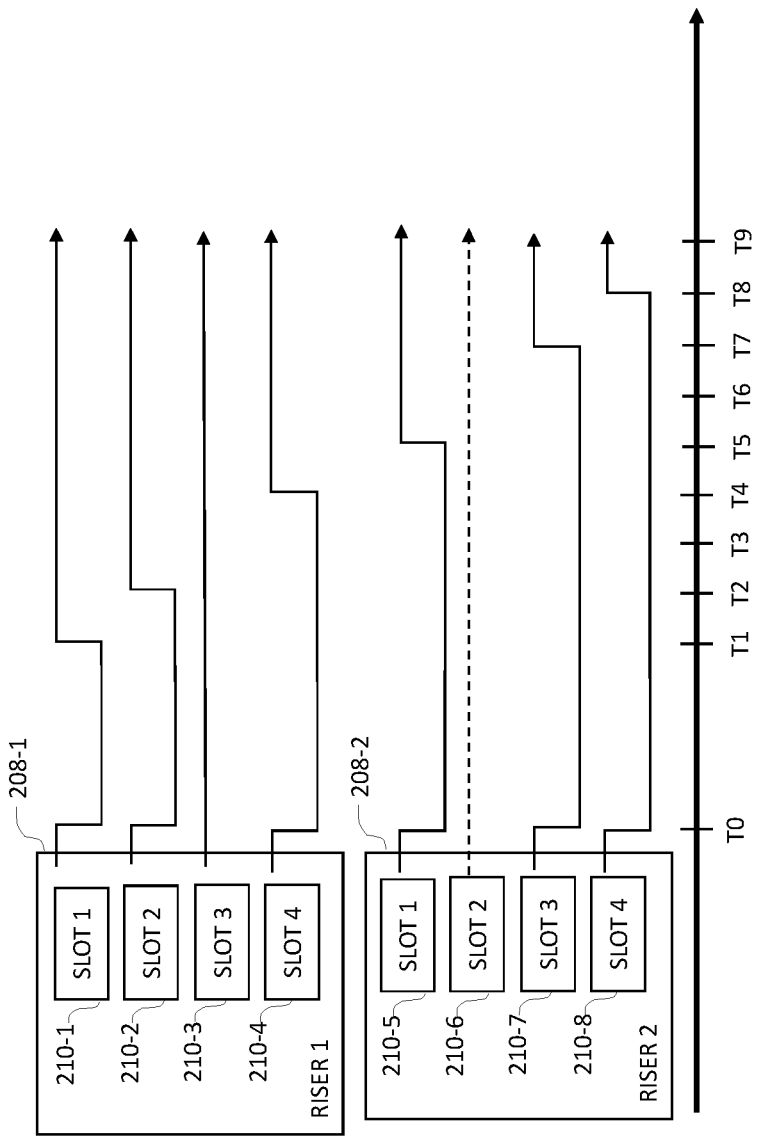
FIG. 5 is a timeline depicting the assertion of a power brake event and a de-assertion of the power brake event with staggered release of power to multiple risers with delay circuits.

Referring to FIGS. 2, 3, 5 and 6, information handling system 100 may be subject to a power brake event, wherein power to risers 208 is abruptly throttled based on events such as, but not limited to, power supply unit (PSU) Voltage In (VIN) undervoltage, PSU current out ($I_{OUT}$) overcurrent, and high PSU temperature (PSU overtemp). As depicted in FIGS. 3, 5 and 6, a signal to assert a power brake event may be communicated at time T0. CPLD 204 may communicate a signal to throttle power to all risers 208. A signal may be communicated over a low latency path, such as a one-wire path. In some embodiments, CPLD 204 holding a one-wire signal low signals MCUs 206 to assert a power brake event. Each MCU 206 may mirror the signal by throttling power to all slots 210 on its riser card 208 such that power to all risers 208 is throttled at the same time. For example, at time T0, CPLD 204 may send a signal to MCUs 206 to throttle power. MCU 206-1 may receive the signal from CPLD 204 and throttle power to slots 210 on riser 208-1 and MCU 206-2 may receive the signal from CPLD 204 and throttle power to slots 210 on riser 208-2.

De-Assertion of a Power Brake Event

Still referring to FIGS. 2, 3, 5 and 6, a power brake event may be de-asserted at time T1. During de-assertion of a power brake event, power is released to endpoints in the information handling system 100, including risers 208 and slots 210 on risers 208. A signal to de-assert a power brake event may be communicated by CPLD 204 over a low latency path, such as a one-wire path. CPLD 204 holding a one-wire signal high signals MCUs 206 to de-assert a power brake event. Each MCU 206 may mirror the signal by releasing power to all slots 210 on its riser 208 such that power to all risers 208 is released at the same time. For example, at time T1, CPLD 204 may send a signal to MCUs 206 to release power. MCU 206-1 may receive the signal from CPLD 204 and release power to slots 210 on riser 208-1 and MCU 206-2 may receive the signal from CPLD 204 and release power to slots 210 on riser 208-2.

Releasing Power to Multiple Endpoints Causes a Current Spike

De-assertion from a power brake event may be problematic. Referring to FIGS. 2 and 3, if CPLD 204 sends a signal to de-assert a power brake event to multiple MCUs 206 on multiple risers 208 simultaneously, the inrush of current to multiple slots 210 in one or more risers 208 spikes. As information handling systems 100 may be operating at high power levels, a current spike could exceed the system capacitance capability or the maximum operating parameters of a power supply unit (PSU) and cause unwanted behavior of information handling system 100. These unwanted behaviors may include a full system crowbar situation in which a crowbar circuit is triggered and all power must be removed before information handling system 100 can return to normal operation.

Staggered Release of Power to Prevent Current Spikes

To overcome these problems and smooth the inrush of electrical power to multiple endpoints in an information handling system, embodiments disclosed herein may be generally directed to systems for staggering the release of power to endpoints when a power brake event is de-asserted, wherein an endpoint may refer to a riser 208 or a slot 210 in a riser 208. Staggering the release of power to multiple endpoints may ensure the inrush current does not spike or an inrush current spike does not exceed a current spike threshold. As used herein, staggering may refer to releasing power to each endpoint individually with sufficient time to power up before power is released to other endpoints.

Staggering the Release of Power to Multiple Risers

Figure 4:
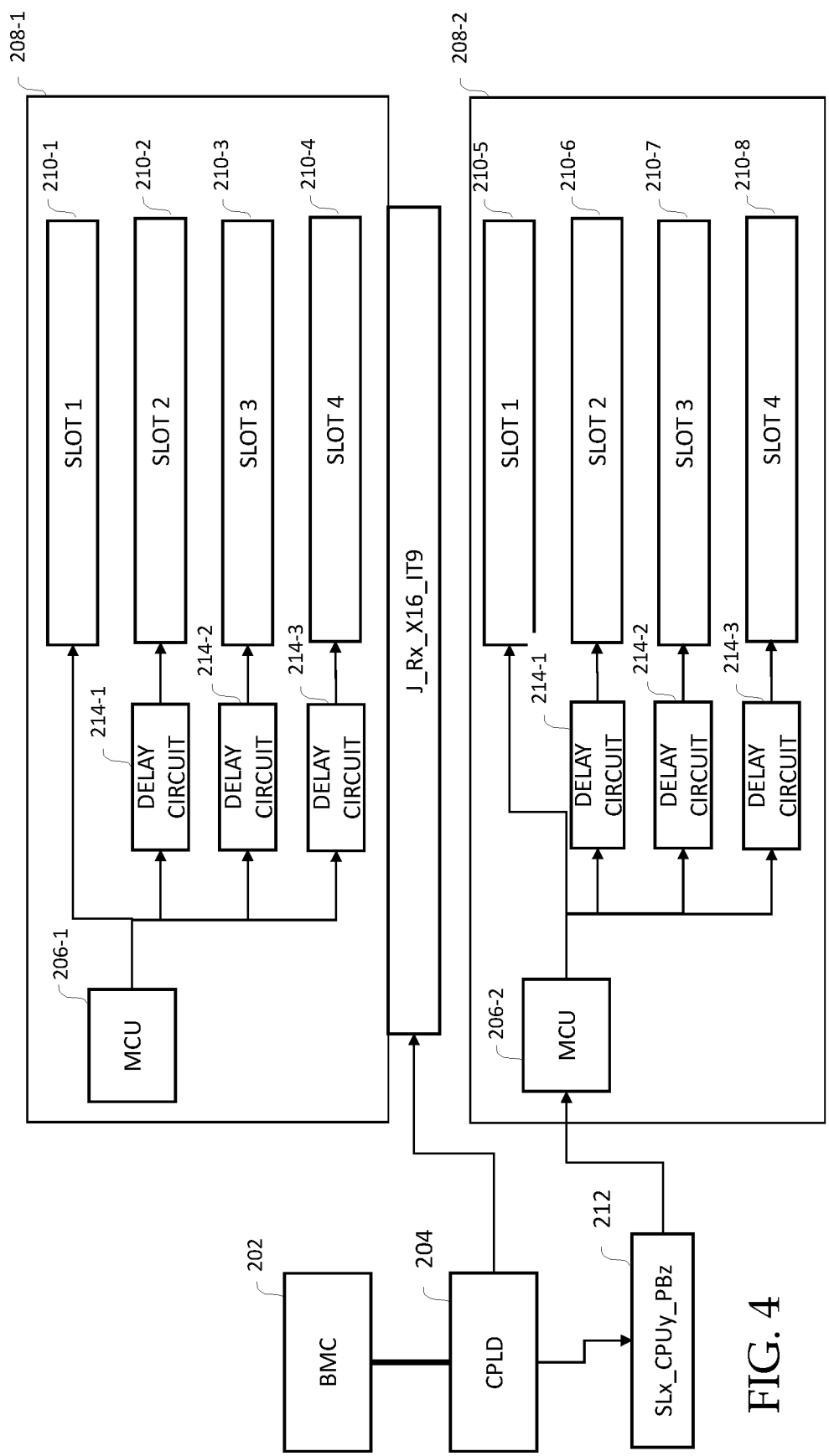
FIG. 4 is a block diagram of components affected by a power brake event and an alternative embodiment of a system for releasing the components from the power brake event.

Referring to FIGS. 4-6, a system for staggering the release of power to endpoints when a power brake event is de-asserted may be embodied in hardware and software.

In some embodiments, BMC 202 may determine an inventory in information handling system 100 during a power on self-test (POST) process or a boot process. The inventory may include information identifying any risers 208. In some embodiments, BMC 202 may determine a source connector instance for each riser 208. In some embodiments, BMC 202 may determine a source connector instance for each riser 208 by assigning a source connector instance to each riser 208. For example, BMC 202 may identify first riser 208-1 and second riser 208-2, determine first riser 208-1 and second riser 208-2 should be affected by a power brake event, and assign first riser 208-1 a first source connector instance and assign second riser 208-2 a second source connector instance. BMC 202 may communicate information to CPLD 204 including an intended fixed riser location of each riser 208.

In some embodiments, each MCU 206 communicates with BMC 202 and is aware of its intended fixed riser location. Each MCU 206 may determine its position in the order in which power is to be released to risers 208 for recovery from a power brake event. In some embodiments, each MCU 206 is aware of its cable connection number, coupling or intended fixed riser location and uses this information to determine its position in the order in which power is to be released to risers 208 for recovery from a power brake event. For example, first MCU 206-1 may communicate with BMC 202 and determine, based on its cable connection number, coupling or intended fixed riser location, that riser 208-1 is first in the order to release power and second MCU 206-2 may communicate with BMC 202 and determine, based on its cable connection number, coupling or intended fixed riser location, that riser 208-2 is second in the order to release power.

In some embodiments, each MCU 206 communicates with BMC 202 to determine a riser offset time for delaying the release of power. For example, each MCU 206 may communicate with BMC 202 to determine its position in the order to release power and determine a 10 ms riser offset time for each riser 208 before its position. For example, first MCU 206-1 may communicate with BMC 202 to determine it is first in the order to receive power and determine no riser offset time is needed before releasing power to slots 210, whereas second MCU 206-1 may communicate with BMC 202 to determine it is second in the order to receive power and determine a 10 ms riser offset time before releasing power to slots 210. Thus, if CPLD 204 communicates a signal to de-assert a power brake event, first MCU 206-1 may immediately release power to slots 210 on first riser 208-1 and second MCU 206-2 may delay releasing power to slots 210 on second riser 208-2 by 10 ms. Each MCU 206 implementing a unique riser offset time based on its cable connection number, coupling or intended fixed riser location staggers the de-assertion of a power brake event such that no two risers 208 release power at the same time.

Fixed Offset Times for Staggered Release of Power to Multiple Slots on a Riser

Staggering the release of power to multiple risers 208 may limit the current spike, but risers 208 may have multiple slots 210 and simultaneous release of power to multiple slots 210 on the same riser 208 might not be possible using only software implemented by BMC 202, CPLD 204 or MCU 206. To prevent multiple slots 210 on the same riser 208 from releasing from a power brake event and causing an unwanted power spike, embodiments may include delay circuits 214 coupled to one or more slots 210. Each delay circuit 214 may be configured with a predefined and unique offset time for staggering the release of power to a corresponding slot 210. In some embodiments (not shown), each delay circuit 214 may be configured as an N-channel MOSFET with a source connected to ground and a drain connected to an RC delay with a Schmitt trigger buffer. In some embodiments, delay circuits 214 may be configured with larger resistance (R) and capacitance (C) values such that the capacitance discharge delay is minimized when a power brake event is asserted by CPLD 204.

Referring to FIG. 4, in some embodiments, riser 208-1 may be configured with slot 210-1 without a delay circuit 214 such that slot 210-1 receives power immediately when riser 208-1 is released from a power brake event. Similarly, riser 208-2 may be configured with slot 210-5 without a delay circuit 214 such that slot 210-5 receives power immediately when riser 208-2 is released from a power brake event.

Other slots 210 on risers 208-1 and 208-2 may be configured with delay circuits 214 configured to provide unique offset times to stagger the power brake signal de-assertion timing. To stagger the release of other slots 210 on first riser 208-1, slot 210-2 may be connected to delay circuit 214-1 configured with a first offset time to provide a first delay (e.g., releasing power after 2.5 ms), slot 210-3 may be connected to delay circuit 214-2 configured with a second offset time to provide a second delay (e.g., releasing power after 5.0 ms) and slot 210-4 may be connected to delay circuit 214-3 configured with a third offset time to provide a third delay (e.g., releasing power after 7.5 ms). Similarly, second riser 208-2 may be configured with slot 210-6 connected to delay circuit 214-1 configured with the first offset time to provide a first delay (e.g., releasing power after 2.5 ms), slot 210-7 connected to delay circuit 214-2 configured with the second offset time to provide a second delay (e.g., releasing power after 5.0 ms) and slot 210-8 may be connected to delay circuit 214-3 configured with a third offset time to provide a third delay (e.g., releasing power after 7.5 ms). Based on this configuration, the total offset time to de-assert all endpoints may require approximately 20 ms.

Not all Endpoints Subject to a Power Brake Event

Still referring to FIG. 4, embodiments may use MCUs 206 executing instructions to stagger the release of power between multiple risers 208 in combination with multiple delay circuits 214 on each riser 208 to delay the release of power to one or more slots 210 and ensure no two endpoints receive power at the same time. However, one or more risers 208 or one or more slots 210 in a riser 208 may not be subject to a power brake event such that throttling power to all risers 208 or all slots 210 on a riser 208 may be unnecessary or unwanted. For example, in some information handling systems 100, a critical load may be identified as not subject to a power brake event. For example, a critical load may be assigned to a PCIe slot accelerator in slot 210-3 such that power should not be throttled during a power brake event. Furthermore, slot 210-6 may not be coupled to a card or other device and may therefore not need power. These slots 210 may be masked to ensure they are not subject to the power brake event. However, using a hardware-based approach with delay circuits 214 may result in the de-assertion of a power brake event always over the same total time. This configuration may be referred to as a fixed or static configuration.

Dynamic System to Adjust Offset Times for Staggered Release of Power to Multiple Endpoints In some information handling systems 100, additional connections may allow assertion and de-assertion of a power brake event to individual endpoints. For example, an increase in the number of pins may increase the granularity such that a slot-level power brake event may be implemented. In these embodiments, hardware and firmware in MCUs 206 or CPLD 204 may execute instructions so each slot 210 can be released or blocked independently. By connecting each endpoint with MCU 206 and capable of receiving an independent signal, embodiments may selectively and dynamically control the release of power to each riser 208 and each slot 210 on each riser 208, including adjusting offset times to collapse the total time to recover from a power brake event.

Initial Calculation of Offset Times

As described above, embodiments may determine an order for staggering the release of power to multiple risers 208 when a power brake event is de-asserted. In some embodiments, BMC 202 may determine an inventory in information handling system 100 during a power on self-test (POST) process or a boot process. The inventory may include information identifying risers 208. As depicted in FIG. 4, BMC 202 may determine information handling system 100 comprises two risers 208 subject to a power brake event and identify one riser 208 as first riser 208-1 and identify the other riser 208 as second riser 208-2.

BMC 202 may determine a source connector instance for each riser 208. In some embodiments, BMC 202 may determine a source connector instance for each riser 208 by assigning a source connector instance to each riser 208. For example, BMC 202 may identify first riser 208-1 and second riser 208-2, determine first riser 208-1 and second riser 208-2 should be affected by a power brake event, and assign first riser 208-1 a first source connector instance and assign second riser 208-2 a second source connector instance. BMC 202 may communicate information to CPLD 204 including an intended fixed riser location or a source connector instance for each riser 208.

In some embodiments, each MCU 206 communicates with BMC 202 and is aware of its intended fixed riser location. Each MCU 206 may determine its position in the order in which power is to be released to risers 208 for recovery from a power brake event. In some embodiments, each MCU 206 is aware of its cable connection number, coupling or intended fixed riser location and uses this information to determine its position in the order in which power is to be released to risers 208 for recovery from a power brake event. For example, first MCU 206-1 may communicate with BMC 202 and determine its intended fixed riser location is first and second MCU 206-2 may communicate with BMC 202 and determine its intended fixed riser location is second.

First MCU 206-1 may calculate, based on its intended fixed riser location, that first riser 208 should receive power immediately such that no staggering or riser offset time is needed. Second MCU 206-2 may calculate, based on its intended fixed riser location, that a riser offset time is needed to prevent a release of power to second riser 208-2 from overlapping a release of power to first riser 208-1 or any of slots 210 on first riser 208-1.

An initial calculation of offset times may be based on the total number of risers 208 and slots 210 on each riser 208. In some embodiments, BMC 202 may generate a power on self-test (POST) inventory and compare the inventory with a whitelist of endpoints supporting a power brake event. If any slot 210 on a riser 208 is on the whitelist, BMC 202 or CPLD 204 may indicate to the MCU 206 which slots 210 are allowed to throttle via new bytes (e.g., SLOTx_PB_ALLOWED) in a one-wire payload.

Referring to FIG. 5, first MCU 206-1 may calculate a riser offset time for riser 208-1 having four slots 210 with slot 210-1 having no delay (e.g., releasing power at time T1), slot 210-2 having a first delay (e.g., releasing power at time T2), slot 210-3 having a second delay (e.g., releasing power at time T3) and slot 210-4 having a third delay (e.g., releasing power at time T4). Assuming a 2.5 ms delay between slots 210, first MCU 206-1 may calculate that power should be released to slot 210-1 immediately, released to slot 210-2 after a 2.5 ms offset time and released to slot 210-4 after a 7.5 ms offset time. Second MCU 206-1 may determine second riser 208-1 is designated as the second riser 208 to receive power. Second MCU 206-1 may determine a riser offset time is needed to prevent a release of power to second riser 208-2 from overlapping a release of power to first riser 208-1 or any of slots 210 on first riser 208-1. Second MCU 206-2 may calculate that power should be released to slot 210-5 at time T4 (after a 10 ms riser offset time). Assuming a 2.5 ms delay between the release of power to individual slots 210 and including the riser offset time, second MCU 206-2 may calculate that power should be released to slot 210-7 at time T7 (after a 15.0 ms offset time) and released to slot 210-8 at time T8 (after a 17.5 ms offset time). As depicted in FIG. 5, the total time needed to de-assert a power brake event may occur at time T9, approximately 20 ms after CPLD 204 communicated a signal to de-assert the power brake event. Accordingly, if every riser 208 and every slot 210 is subject to a power brake event, these embodiments may de-assert the power brake event at the same time as the fixed approach using delay circuits 214.

Reassigning and Recalculating to Reduce Delays in De-Asserting

In many configurations of information handling systems 100, not every endpoint is subject to a power brake event. To reduce the total time needed to de-assert a power brake event, embodiments may identify endpoints not subject to the power brake event and reassign risers 208 and calculate offset times for each slot 210 based on the actual number of risers 208 and slots 210 subject to the power brake event.

In some embodiments, BMC 202 may determine one or more risers 208 not subject to the power brake event or not having slots 210 and reassign those risers 208. In some embodiments, BMC 202 may identify a riser 208 that should not be affected by a power brake event and not assign a source connector instance to that riser 208. In other embodiments, BMC 202 may identify a riser 208 that should not be affected by a power brake event and assign a source connector instance to that riser 208 indicating the riser 208 should not be affected by a power brake event.

In some embodiments, BMC 202 may determine first riser 208-1 has a set of slots 210 and determine second riser 208-2 also has a set of slots 210. In some embodiments, BMC 202 may determine first riser 208-1 has four slots 210 (e.g., slot 210, 1, 210-2, 210-3 and 210-4) and second riser 208-2 also has four slots (e.g., slot 210-5, 210-6, 210-7 and 210-8).

In some embodiments, BMC 202 may determine one or more slots 210 in first riser 208-1 should not be subject to a power brake event. Referring to FIGS. 4 and 6, BMC 202 may determine slot 210-3 in first riser 208-1 should not be subject to a power brake event and slot 210-6 in second riser 208-2 does not have a component installed. Thus, the total time needed to de-assert a power brake event to information handling system 100 can be reduced.

Referring to FIG. 6, first MCU 206-1 may determine slot 210-3 is not subject to a power brake event and may calculate the riser offset time needed by first riser 208-1 to de-assert a power brake event based on only three slots 210. First MCU 206-1 may calculate that power should be released to riser 208-1 first and power should be released to slot 210-1 immediately (e.g., at time T1), released to slot 210-2 based on a first offset time (e.g., releasing power at time T2) and released to slot 210-4 based on a second offset time (e.g., releasing power at time T3 instead of T4). Assuming a 2.5 ms delay needed to allow each slot 210 to power up, first MCU 206-1 may calculate power should be released to slot 210-1 immediately, released to slot 210-2 after 2.5 ms and released to slot 210-4 after 5.0 ms (instead of 7.5 ms). First MCU 206-1 may communicate the riser offset time to BMC 202. Second MCU 206-1 may determine second riser 208-1 is designated as the second riser 208 to receive power and may determine power should be released to slot 210-5 after 7.5 ms (instead of 10 ms). Assuming a 2.5 ms delay needed to allow each slot 210 to power up, second MCU 206-2 may calculate power should be released to slot 210-7 after 10.0 ms (instead of 15 ms) and released to slot 210-8 after 12.5 ms (instead of 17.5 ms). As depicted in FIG. 6, the total time needed to de-assert a power brake event may occur approximately 15 ms after the signal to de-assert the power brake event (instead of 20 ms). Thus, embodiments may reduce the total time needed to release power to all endpoints after de-asserting a power brake event.

Embodiments described above are able to implement a low latency signal to support all possible endpoints regardless of for factor, riser or slot count. Embodiments may also alter the power brake policy for each slot 210 based on lack of support for a power brake event, performance critical slots 210, other user policies while maintaining a physical riser signal. A low latency system protects instant power throttling needs with staggered de-assertions of power brake events for static and dynamic control of current inrush. Furthermore, the ability to alter or reduce each riser's release after system inventory allows information handling system 100 to maximize performance.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A system for controlling power to multiple endpoints, the system comprising:
    a baseboard management controller (BMC) comprising a set of BMC instructions to:
        identify a set of risers subject to a power brake event;
        determine an order for releasing power to each riser of the set of risers; and
        communicate the order to a complex programmable logic device (CPLD), the CPLD configurable to communicate a first signal to assert a power brake event and communicate a second signal to de-assert the power brake event; and
    a microcontroller unit (MCU) on a riser of the set of risers, the MCU comprising:
        a MCU processor; and
        a set of MCU instructions executable by the MCU processor to:
            communicate with the BMC to determine a source connector instance identifier for the riser;
            determine a riser offset time for the riser based on the source connector instance identifier for the riser; and
            in response to receiving the first signal from the CPLD to assert the power brake event, throttle power to a set of slots on the riser;
            in response to receiving the second signal from the CPLD to de-assert the power brake event, release power to the set of slots on the riser based on the riser offset time.

2. The system of claim 1, wherein the riser comprises:
a first slot configured to receive power with no delay when power is released to the riser; and
a second slot with a delay circuit configured to delay power to the second slot when power is released to the riser.

3. The system of claim 2, wherein the delay circuit comprises:
a resistor-capacitor (RC) delay circuit configured to delay power supply to the second slot; and
a Schmitt trigger buffer located between the RC delay circuit and the second slot.

4. The system of claim 3, wherein one or more of the resistor and the capacitor is configured to minimize a discharge of the capacitor when a power brake event is asserted.

5. The system of claim 1, wherein the riser comprises one of a fixed riser or a floating riser.

6. The system of claim 1, wherein:
the CPLD is configured to communicate with the MCU using a one-wire signal; and
the MCU instructions are executable by the MCU processor to:
monitor one-wire signals communicated by the CPLD;
assert a power brake event on the riser when the one-wire signal comprises a first voltage; and
de-assert the power brake event on the riser when the one-wire signal comprises a second voltage greater than the first voltage.

7. The system of claim 1, wherein the BMC is configured to:
determine a source connector instance identifier for each riser of the set of risers; and
communicate the source connector instance identifier to the MCU.

8. The system of claim 1, wherein the BMC is configured to:
determine a cable connection number for each riser of the set of risers; and
communicate the cable connection number to the MCU.

9. An information handling system, comprising:
a baseboard management controller (BMC) comprising a set of BMC instructions to:
identify a set of risers subject to a power brake event;
determine an order for releasing power to each riser of the set of risers; and
communicate the order to a complex programmable logic device (CPLD) having a set of CPLD instructions to communicate a first signal to the set of risers to assert a power brake event and communicate a second signal to the set of risers to de-assert the power brake event; and
a microcontroller unit (MCU) on a riser of the set of risers, wherein the MCU is configured to;
communicate with the BMC to determine the order that power will be released to the riser;
determine a riser offset time for the riser based on the order that power will be released to the riser; and
in response to receiving the first signal from the CPLD to assert the power brake event, throttle power to a set of slots on the riser; and
in response to receiving the second signal from the CPLD to de-assert the power brake event, release power to the set of slots on the riser based on the riser offset time.

10. The information handling system of claim 9, wherein the riser comprises:
a first slot configured to receive power with no delay when power is released to the riser; and
a second slot coupled to a delay circuit configured to delay the release of power to the second slot when power is released to the riser.

11. The information handling system of claim 10, wherein the delay circuit comprises:
a resistor-capacitor (RC) delay circuit configured to delay the release of power to the second slot; and
a Schmitt trigger buffer located between the RC delay circuit and the second slot.

12. The information handling system of claim 11, wherein one or more of the resistor and the capacitor is configured to minimize a discharge of the capacitor when a power brake event is asserted.

13. The information handling system of claim 9, wherein the riser comprises one of a fixed riser or a floating riser.

14. The information handling system of claim 9, wherein:
the CPLD is configured to communicate with the MCU using a one-wire signal; and
the MCU instructions are executable by the MCU processor to:
monitor one-wire signals communicated by the CPLD;
assert a power brake event on the riser when the one-wire signal comprises a first voltage; and
de-assert the power brake event on the riser when the one-wire signal comprises a second voltage greater than the first voltage.

15. The information handling system of claim 9, wherein the BMC is configured to:
determine a source connector instance identifier for each riser of the set of risers; and
communicate the source connector instance identifier to the MCU.

16. The information handling system of claim 9, wherein the BMC is configured to:
determine a cable connection number for each riser of the set of risers; and
communicate the cable connection number to the MCU.

17. A method for releasing multiple endpoints from a power brake event, the method comprising:
determining, by a baseboard management controller (BMC), a set of risers receiving power in an information handling system;
determining a source connector instance identifier for each riser of the set of risers;
determining a set of slots on each riser;
calculating an offset time for each slot based on the source connector instance of the riser and the number of slots on the riser; and
communicating, to a microcontroller unit (MCU) on a riser, the offset time for each slot based on the source connector instance identifier and the number of slots on the riser, wherein
in response to receiving a first signal from a complex programmable logic device (CPLD) to assert the power brake event, the MCU throttling power to the set of slots; and
in response to receiving a second signal from the CPLD to de-assert the power brake event, the MCU releasing power to each slot of the set of slots based on the offset time for the slot.

18. The method of claim 17, wherein:
a first riser comprises a first set of slots and a first MCU;
the first MCU is configured to perform:
- determining a quantity of slots on the first riser subject to the power brake event;
- calculating a riser offset time for the first riser based on the number of slots on the first riser and a time period allotted to release power individually to each slot; and
- communicating the riser offset time for the first riser to the BMC;

the BMC is configured to perform:
- receiving the riser offset time for the first riser; and
- communicating the riser offset time to a second MCU on a second riser; and the second MCU is configured to perform:
- receiving the riser offset time from the CPLD; and
- calculating an offset time for each slot on the second riser based on the source connector instance of the second riser and the number of slots on the second riser.

19. The method of claim 17, comprising:
communicating, by the CPLD, the first signal with a first voltage over a one-wire channel;
communicating, by the CPLD, the second signal with a second voltage greater than the first voltage over the one-wire channel.

20. The method of claim 17, wherein determining the set of risers receiving power in the information handling system and determining the set of slots on each riser are performed during one of a power on self-test (POST) process or a boot process.

* * * * *